US012739134B2

(12) United States Patent
Anderson et al.

(10) Patent No.: US 12,739,134 B2
(45) Date of Patent: Sep. 15, 2026

(54) WHITE-BOX SOFT-LOCKING

(71) Applicant: ARRIS Enterprises LLC, Suwanee, GA (US)

(72) Inventors: Lex Aaron Anderson, Auckland (NZ); Fariba Barez, San Diego, CA (US)

(73) Assignee: ARRIS Enterprises LLC, Horsham, PA (US)

( * ) Notice: Subject to any disclaimer, the term of this patent is extended or adjusted under 35 U.S.C. 154(b) by 280 days.

(21) Appl. No.: 18/083,424

(22) Filed: Dec. 16, 2022

(65) Prior Publication Data

US 2023/0198781 A1 Jun. 22, 2023

Related U.S. Application Data

(60) Provisional application No. 63/290,191, filed on Dec. 16, 2021.

(51) Int. Cl.
*H04L 29/06* (2006.01)
*H04L 9/08* (2006.01)
*H04L 9/32* (2006.01)

(52) U.S. Cl.
CPC .......... *H04L 9/3263* (2013.01); *H04L 9/0825* (2013.01); *H04L 9/3231* (2013.01)

(58) Field of Classification Search
None
See application file for complete search history.

(56) References Cited

U.S. PATENT DOCUMENTS 8,468,244 B2 6/2013 Redlich et al.
10,511,436 B1 * 12/2019 Machani ................. H04L 9/085
10,778,654 B2 * 9/2020 Mullen ............... H04L 63/0478
(Continued)

FOREIGN PATENT DOCUMENTS

CN 105281893 A 1/2016
WO 2018106439 A1 6/2018

OTHER PUBLICATIONS

Anderson, L.A., "White-box node-locking", May 7, 2015, pp. 1-20.
(Continued)

*Primary Examiner* — Eleni A Shiferaw
*Assistant Examiner* — Hassan A Hussein
(74) *Attorney, Agent, or Firm* — Chernoff, Vilhauer, McClung & Stenzel, LLP

(57) ABSTRACT

A method and apparatus for securely generating an output. In one embodiment, the method comprises generating a white-box implementation having unlocked white-box look up table (LUTs) for node-encoded secrets, the node-encoded secrets to be encoded for operation solely on a node of a network and globally encoded white-box LUTs for globally-encoded secrets to be encoded for operation on the node and at least another node; generating, from the white box implementation, a soft-locked white-box implementation having a plurality of node-specific locked white-box LUTs and modified globally encoded LUTs. The method further comprises receiving a global secret encoded according to the base file; generating the node-encoded secrets by applying node-specific locking transformations to the global secret; and generating, by the node, the output according to at least one of the globally-encoded secrets or the node-encoded secrets.

12 Claims, 11 Drawing Sheets

(56) References Cited

U.S. PATENT DOCUMENTS

| | | | | |
|---|---|---|---|---|
| 2015/0089645 | A1* | 3/2015 | Vandergeest | G06F 21/54 726/23 |
| 2017/0243021 | A1* | 8/2017 | Gupta | G06F 21/6218 |
| 2018/0082076 | A1* | 3/2018 | Murray | H04L 63/10 |
| 2018/0165454 | A1* | 6/2018 | Anderson | G06F 21/125 |
| 2018/0219680 | A1* | 8/2018 | Kamal | G06F 21/53 |
| 2018/0287779 | A1* | 10/2018 | Lee | H04L 9/0869 |
| 2018/0351918 | A1* | 12/2018 | Hoogerbrugge | G06F 8/60 |
| 2019/0272162 | A1* | 9/2019 | Couillard | G06F 21/125 |
| 2020/0092081 | A1* | 3/2020 | Rietman | H04L 9/0618 |
| 2021/0240804 | A1* | 8/2021 | Kubota | B60R 25/246 |
| 2024/0296250 | A1* | 9/2024 | Ueno | G06F 21/64 |

OTHER PUBLICATIONS

International Search Report and Written Opinion RE: Application No. PCT/US22/53263, dated Dec. 16, 2022.

Shamsaasef Rafie et al: "Dynamically Addressing the Gap of Software Application Protection without Hardware Security A Technical Paper prepared for SCTE@BULLETISBE by", SCTE-ISBE cable tech expo, Oct. 3, 2019, pp. 1-28, XP093040266, Retrieved from the Internet: URL:https://www.nctatechnicalpapers.com/Paper/2019/2019-dynamically-addressing-the-gap-of-software-application-protection-without-hardware-security [retrieved on Apr. 19, 2023] paragraph [0002] paragraph [0004].

Brecht Wyser: "A White-Box Cryptography", Mar. 1, 2009, XP055599214, Retrieved from the Internet: URL:https://www.esat.kuleuven.be/cosic/publications/thesis-152.pdf [retrieved on Jun. 25, 2019] paragraph [0003].

Brecht Wyser: "A White-Box Cryptography: Hiding Keys in Software", Feb. 15, 2012, XP055080943, Retrieved from the Internet: URL:http://whiteboxcrypto.com/files/2012_misc.pdf [retrieved on Sep. 25, 2013] paragraph [0003].

Wartell Richard Richard Wartell@Utdallas EDU et al: "Binary stirring self-randomizing instruction addresses of legacy x86 binary code", CCS '12 Proceedings of The 2012 ACM Conference on Computer and Communications Security; Raleigh, North Carolina, USA—Oct. 16-18, 2012, ACM, New York , USA, Oct. 16, 2012, pp. 157-168, XP058500199, , DOI 10.1145/2382196.2382216 ISBN: 978-1-4503-1651-1 paragraph [0003]-paragraph [0004].

Office Action dated Jun. 26, 2026 in corresponding Taiwanese Patent Application No. 111148239.

* cited by examiner

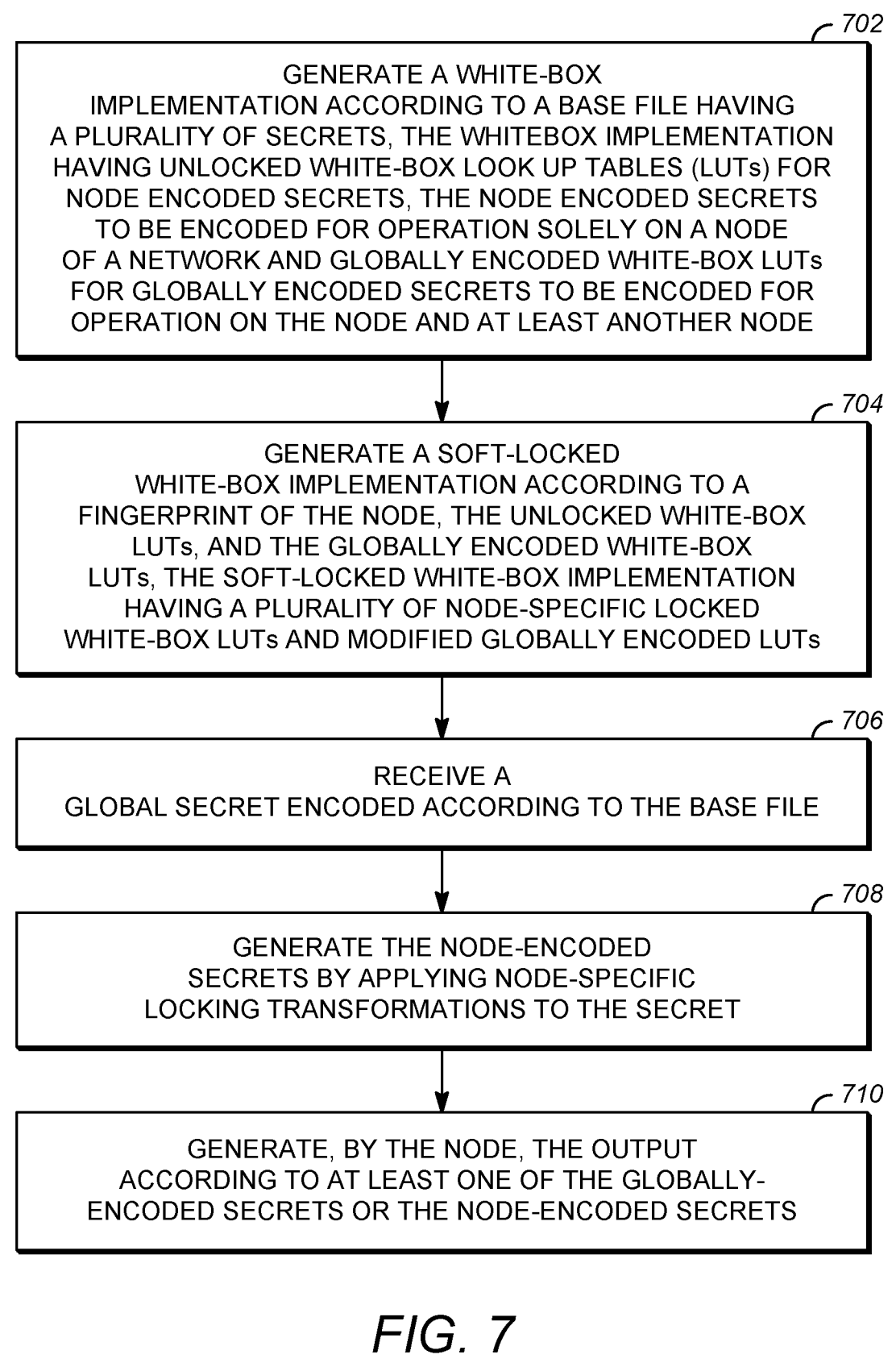

702: GENERATE A WHITE-BOX IMPLEMENTATION ACCORDING TO A BASE FILE HAVING A PLURALITY OF SECRETS, THE WHITEBOX IMPLEMENTATION HAVING UNLOCKED WHITE-BOX LOOK UP TABLES (LUTs) FOR NODE ENCODED SECRETS, THE NODE ENCODED SECRETS TO BE ENCODED FOR OPERATION SOLELY ON A NODE OF A NETWORK AND GLOBALLY ENCODED WHITE-BOX LUTs FOR GLOBALLY ENCODED SECRETS TO BE ENCODED FOR OPERATION ON THE NODE AND AT LEAST ANOTHER NODE

704: GENERATE A SOFT-LOCKED WHITE-BOX IMPLEMENTATION ACCORDING TO A FINGERPRINT OF THE NODE, THE UNLOCKED WHITE-BOX LUTs, AND THE GLOBALLY ENCODED WHITE-BOX LUTs, THE SOFT-LOCKED WHITE-BOX IMPLEMENTATION HAVING A PLURALITY OF NODE-SPECIFIC LOCKED WHITE-BOX LUTs AND MODIFIED GLOBALLY ENCODED LUTs

706: RECEIVE A GLOBAL SECRET ENCODED ACCORDING TO THE BASE FILE

708: GENERATE THE NODE-ENCODED SECRETS BY APPLYING NODE-SPECIFIC LOCKING TRANSFORMATIONS TO THE SECRET

710: GENERATE, BY THE NODE, THE OUTPUT ACCORDING TO AT LEAST ONE OF THE GLOBALLY-ENCODED SECRETS OR THE NODE-ENCODED SECRETS

FIG. 7

WHITE-BOX SOFT-LOCKING

CROSS-REFERENCE TO RELATED APPLICATIONS

The present application claims priority to U.S. Provisional Patent Application No. 63/290,191, filed Dec. 16, 2021, the content of which is incorporated herein by reference in its entirety.

BACKGROUND

1. Field

The present disclosure relates to systems and methods for securing data, and in particular to a system and method for generating secure cryptographic outputs using white-box techniques.

2. Description of the Related Art

The goal of much of cryptography is to allow dissemination of information in such a way that prevents disclosure to unauthorized entities. This goal has been met using cryptographic systems (such as the Advanced Encryption Standard (AES), Triple Data Encryption Standard (TDES), Rivest-Shamir-Adleman (RSA), Elliptic-Curve Cryptography (ECC)) and protocols.

In the systems implementing such cryptographic systems, it is assumed that the attacker only has access to the input and output of the algorithm performing the cryptographic operation, with the actual processing being performed invisibly in a "black box." For such a model to comply, the black box must provide a secure processing environment. Active research in this domain includes improved and special purpose cryptographic systems (e.g., lightweight block ciphers, authentication schemes, homomorphic public key algorithms), and the cryptanalysis thereof.

While such systems are effective, they are still vulnerable to attack. For example, protocols may be deployed in the wrong context, badly implemented algorithms, or inappropriate parameters may introduce an entry point for attackers.

New cryptanalysis techniques that incorporate additional side-channel information that can be observed during the execution of a crypto algorithm; information such as execution timing, electromagnetic radiation, and power consumption. Mitigating such side channel attacks is a challenge, since it is hard to de-correlate this side-channel information from operations on secret keys. Moreover, the platform often imposes size and performance requirements that make it hard to deploy protection techniques.

Further exacerbating the foregoing problems, more applications are being performed on open devices with general purpose processors (e.g. personal computers, laptops, tablets, and smartphones) instead of devices having secure processors.

In response to the foregoing problems, many systems use "white-box" techniques, in which it is assumed that the attacker has full access to the software implementation of a cryptographic algorithm: the binary is completely visible and alterable by the attacker; and the attacker has full control over the execution platform (CPU calls, memory registers, etc.). In such systems, the implementation itself is the sole line of defense.

White-box cryptography was first published by Chow et al. (Stanley Chow, Philip A. Eisen, Harold Johnson, and Paul C. van Oorschot. A white-box DES implementation for DRM applications. In Proceedings of the ACM Workshop on Security and Privacy in Digital Rights Management (DRM 2002), volume 2696 of Lecture Notes in Computer Science, pages 1-15. Springer, 2002, hereby incorporated by reference herein). This addressed the case of fixed key white-box DES implementations.

The core idea of white-box cryptography is to mathematically alter a program so that the program directly operates on encrypted and encoded secrets without these ever being present in cleartext form. Since these secrets are never present in cleartext form, the attacker can have complete visibility and control of the application and still not be able to make use of or gain any value from them. White-boxes can be static or dynamic. Static white-boxes have fixed secrets that are hard-coded at build-time. Dynamic white-boxes (as illustrated) can receive encoded secrets at runtime.

The goal of a white-box attacker is to recover the secret from a white-box implementation. Typically, white-box cryptography is implemented via lookup tables encoded with bijections. Since these bijections are randomly chosen, it is infeasible for an attacker to brute-force the encodings for a randomly chosen secret from a sufficiently large key space.

SUMMARY

To address the requirements described above, this document discloses a system and method for securely generating an output. In one embodiment, the method comprises generating a white-box implementation according to a base file having a plurality of secrets, the white-box implementation having: unlocked white-box look up table (LUTs) for node-encoded secrets, the node-encoded secrets to be encoded for operation solely on a node of a network and globally encoded white-box LUTs for globally-encoded secrets to be encoded for operation on the node and at least another node; generating, a soft-locked white-box implementation according to a fingerprint of the node, the unlocked white-box LUTs, and the globally encoded white-box LUTs, the soft-locked white-box implementation having a plurality of node-specific locked white-box LUTs and modified globally encoded LUTs; receiving a global secret encoded according to the base file; generating the node-encoded secrets by applying node-specific locking transformations to the global secret; and generating, by the node, the output according to at least one of the globally-encoded secrets or the node-encoded secrets. Another embodiment is evidenced by an apparatus having a one or more processors and communicatively coupled memories storing processor instructions for performing the foregoing operations.

The features, functions, and advantages that have been discussed can be achieved independently in various embodiments of the present invention or may be combined in yet other embodiments, further details of which can be seen with reference to the following description and drawings.

BRIEF DESCRIPTION OF THE DRAWINGS

Referring now to the drawings in which like reference numbers represent corresponding parts throughout:

FIG. 7 is a diagram of one embodiment of a technique for using a soft-locked white-box to enable secure generation of an output;

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Overview

The systems and method disclosed herein describe white-box soft-locking as a low overhead technique for node-locking specific functions of a white-box implementation to use only specific cryptographic keys and secrets (thus making them unusable on other nodes) while retaining one or more unlocked functions of a whitebox implementation so that one or more globally encoded secrets can be securely utilized by other white-box instances. Soft-locking streamlines implementations where a common white-box implementation is used across multiple nodes.

White Box Implementation

A white-box system operates by encoding data elements (such as secret keys) so that they cannot be recovered by an attacker in their cleartext form. A white-box implementation is generated with mathematically altered functions that operate directly on the encoded data elements without decoding them. This guarantees that the secrets remain encoded at all times, thus protecting the implementation against attackers with full access to and control of the execution environment. This is described, for example, in the Chow reference cited above.

Figures 1A, 1B:
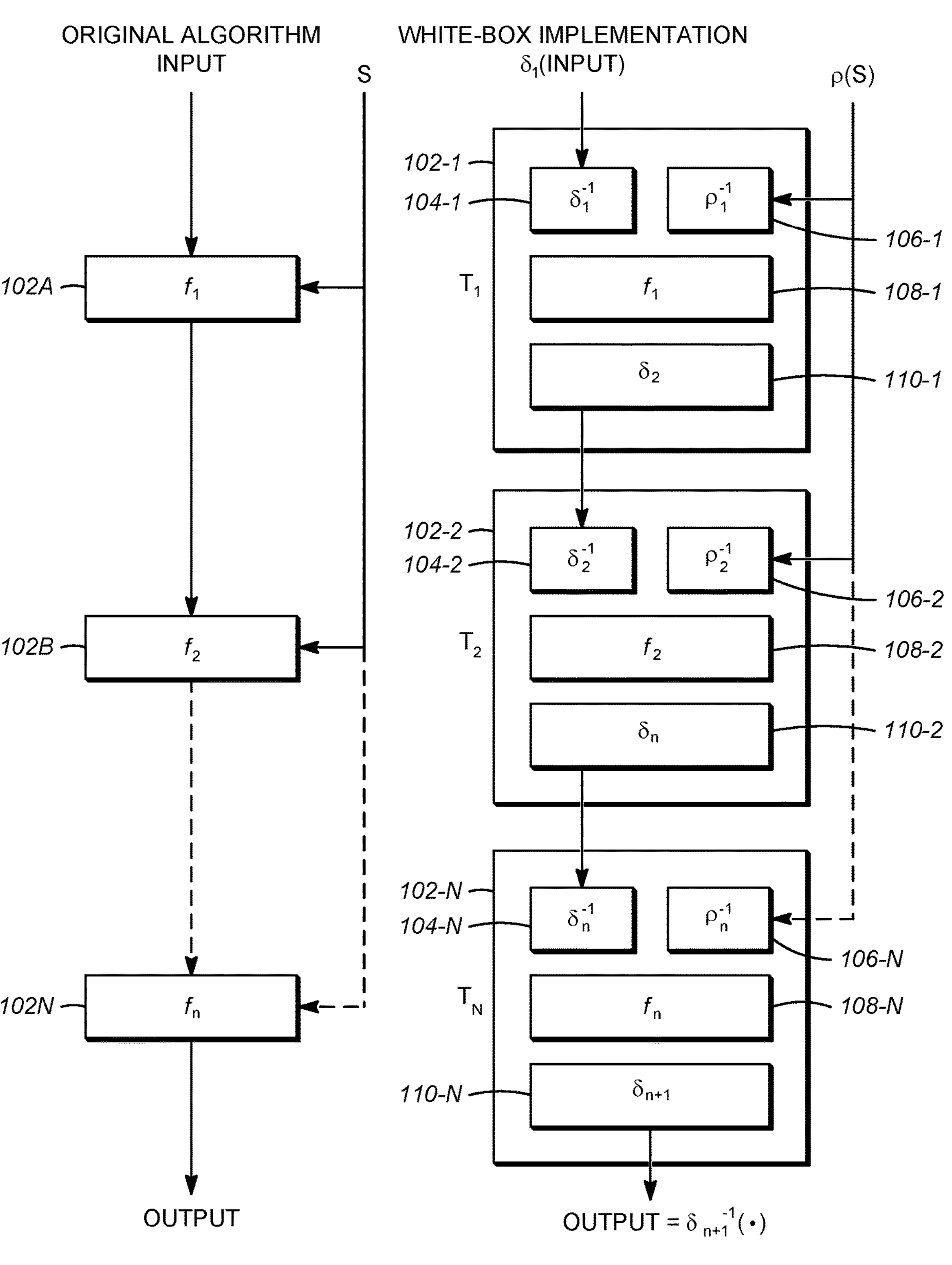
FIGS. 1A and 1B are diagrams of a cryptographic system processing an input message to produce an output message, and its corresponding white-box implementation.

FIGS. 1A and 1B are diagrams of a cryptographic system processing an input message to produce an output message, and its corresponding white-box implementation.

As illustrated in FIG. 1A, the algorithm performs functions $f_1$, $f_2$ and $f_n$ (102A, 102B, and 102N, respectively) when provided with an input and secret S.

In FIG. 1B, each operation $f_1, f_2, \ldots, f_n$ 102A-102B in an original algorithm $\mathcal{A}$(m,S) with input message m and secret S is encoded as a lookup-table (LUT) $T_1, T_2, \ldots, T_n$ (102-1, 102-2, and 102-N, respectively) in the classical white-box implementation of that algorithm. The encodings are generated as two sequences of random bijections, $\delta_1, \delta_2, \ldots, \delta_{n+1}$ 104-1-104-N that are applied to the inputs and output of each operation, where ρ(S) represents an encoded secret (e.g. a secret key), which is either linked statically or provided dynamically to the white-box implementation.

In the white-box implementation shown in FIG. 1B this is implemented by applying bijections $\delta_1$ and ρ(S) as an input to lookup table $T_1$ 102-1 to obtain an intermediate output, applying the intermediate output and ρ(S) to lookup table $T_2$ 102-2 to produce a second intermediate output, then providing the second intermediate output and ρ(S) to lookup table $T_N$ 102-N to produce output $$\delta_{n+1}^{-1}(\cdot).$$

Lookup table $T_1$ inverts the bijection $\delta_1$ of the input by $$\delta_1^{-1}$$

104-1, inverts the bijection ρ of $$S(\rho(S)) \text{ by } \rho_1^{-1}\ 106-1,$$

applies $f_1$ 108-1 and then applies bijection $\delta_2$ 110-1 to produce the first intermediate output. Similarly, lookup table $T_2$ 102-2 inverts the bijection $\delta_2$ 110-1 of the first intermediate input by $$\delta_2^{-1}$$

104-2, inverts the bijection ρ of S(ρ(S)) by $$\rho_2^{-1}$$

106-2, applies $f_2$ 108-2 and then applies bijection $\delta_n$ to produce the first intermediate output. Generally, final lookup table $T_n$ inverts the bijection $\delta_n$ of the n−1$^{th}$ intermediate input by $$\delta_n^{-1}$$

104-N, inverts the bijection ρ of S (ρ(S)) by $$\rho_n^{-1},$$

applies $f_n$ 108-N and then applies bijection $\delta_{n+1}$ 110-N to produce the intermediate output $$\delta_{n+1}^{-1}(\cdot).$$

White-box implementations are usually of cryptographic primitives (such as the advanced encryption standard or AES) and chains of cryptographic primitives used in cryptographic protocols (such as elliptic curve Diffie-Hellman key exchange, or ECDHE). Designing and coding these implementations requires specialist knowledge of white-box cryptography to attain the best possible security properties. Just as importantly, integration with white-box implementations also requires a degree of specialist knowledge to avoid common pitfalls that can negate the white-box security.

White-Box Node Locking

Let $i \in I$ be a white-box implementation instance with encoded lookup tables $T_1, T_2, \ldots, T_n$, each with symbols in a non-empty, finite alphabet $T=\{0, 1, \ldots, m-1\}$, and let $N=[1, \ldots, r\}$ for some $r \geq m!$, then let $C=(c_1, c_2, \ldots, c_n) \in N^n$ be a configuration vector that uniquely identifies a device instance. The configuration vector represents a "fingerprint" of the node and can be determined using node characteristics such as serial numbers and the like. Let $\Sigma$ be the set of all subjective functions from N to $S^T$, where $S^T$ denotes the set of permutations of T.

Example: For a whitebox implementation of n lookup tables, each device stores n indices $c_j$ in the range $1 \leq c_j \leq m! \leq r$. For m=256, suppose the implementation has n=123 lookup tables, then the lower bound storage for C on each device is $123 \log_2 (256!) = 123 \times 210$ bytes or 26 Kb.

Figures 2A, 2B:
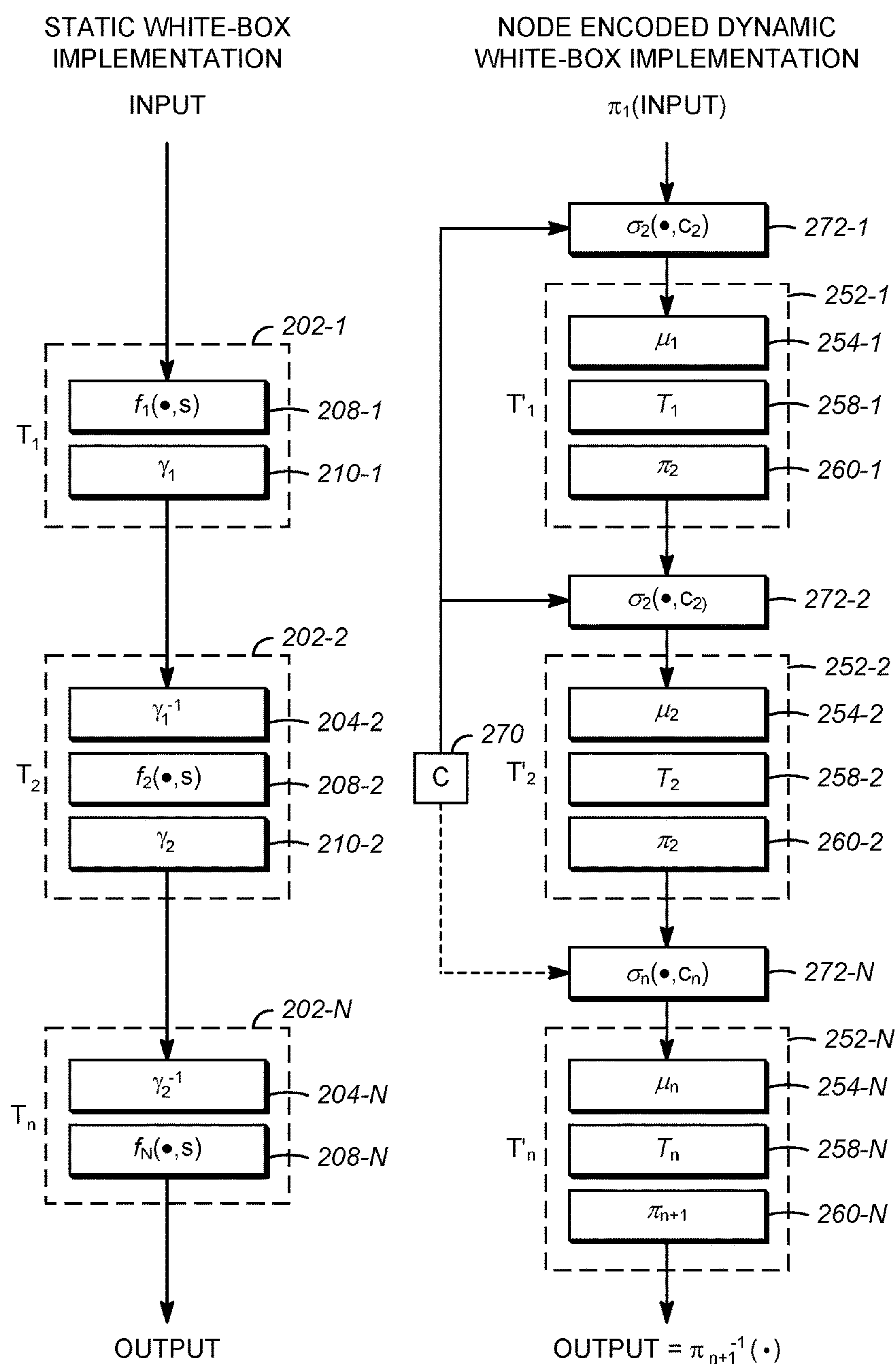
FIG. 2A is a diagram of a static white-box implementation and FIG. 2B is a diagram of a node-encoded static whitebox implementation.

FIG. 2A is a diagram of a static white-box implementation and FIG. 2B is a diagram of a node-encoded (e.g. node-locked) static whitebox implementation. In FIG. 2A, each LUT 202 implements a function 208-1-208-N (according to function 102 of the non white-box implementation), and random bijections $\gamma_1$, 210-*a* and $\gamma_2$ 210-2, that encode the output of each LUT 202 for inversion by inversions 210-2-210-N in the following LUT 202. In FIG. 2B, random bijections $\mu_1, \mu_2, \ldots, \mu_n$, (254-1-254-N) and $\pi_1, \pi_2, \ldots, \pi_{n+1}$ (260-1-260-N)$\in S^T$ and functions $\sigma_1, \sigma_2, \ldots, \sigma_n$ 272-1-272-N)$\in\Sigma$ are generated so that for each coordinate $c_j$ of C 270 and all inputs x, it holds that $\mu_j(\sigma_j(\pi_j(x), c_j))=x$, where the external encodings $\pi_1$ and $\pi_{n+1}^{-1}$ are introduced to bind the white-box implementation to the calling application, and each table $T_1, T_2, \ldots T_n$ (202-1-202-N) of FIG. 2A is replaced with node-encoded tables $T'_1, T'_2, \ldots, T'_n$ (258-1-258-N) to bind the white-box implementation to the node instance, as identified by C 270. The result is node-locked LUTs 252-1-252-N.

Figure 3:
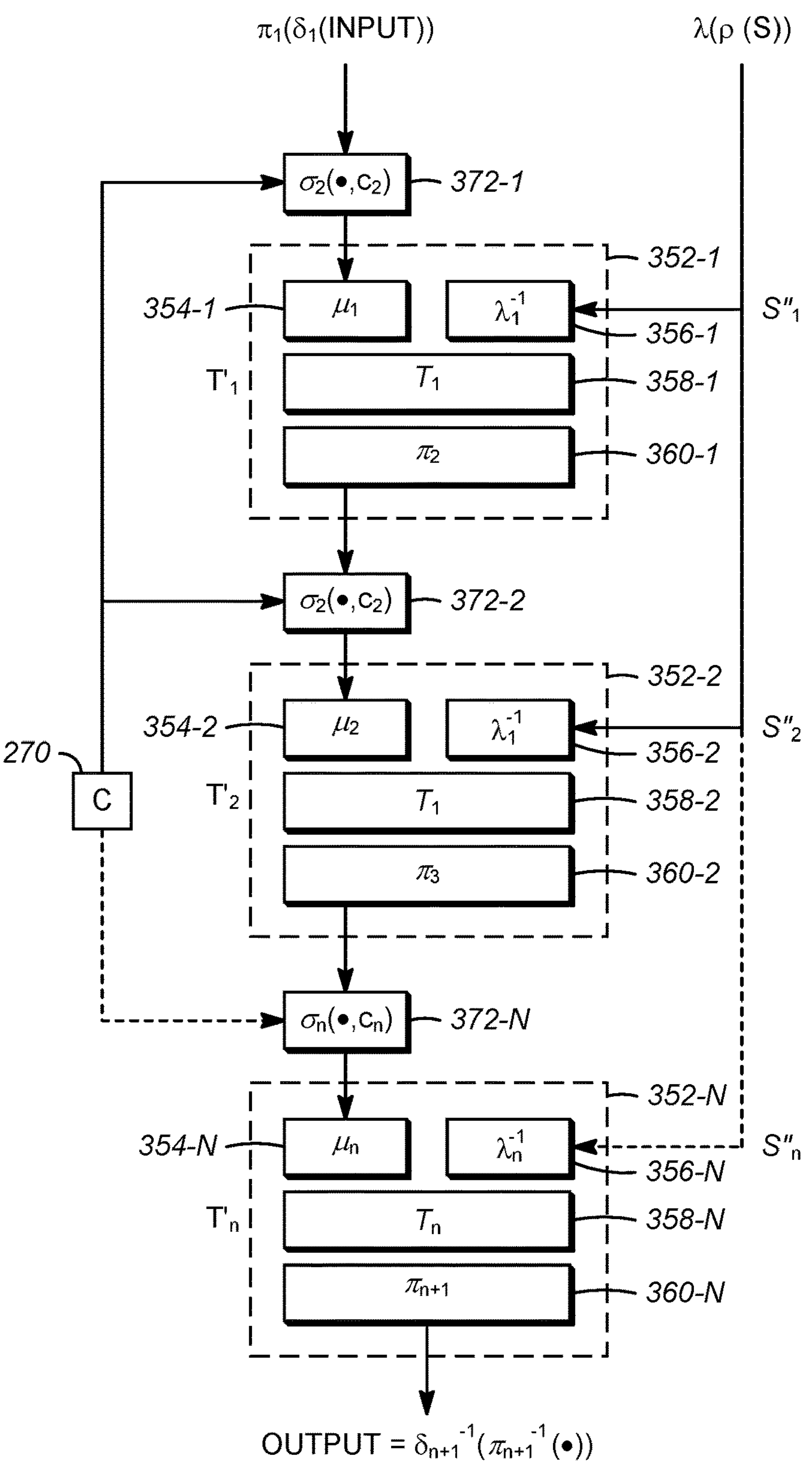
FIG. 3 is diagram illustrating an embodiment of a node-encoded dynamic white box implementation.

FIG. 3 is a diagram illustrating node encoded dynamic white box implementation. In this embodiment, an identifier of the node (e.g. Node ID) is generated at install time. The Node ID is a vector $\lambda=(\lambda_1, \lambda_2, \ldots, \lambda_n)$ that allows for customization of the encoded secret $\rho(S)$ to a node. The Node ID $\lambda$ is sent to a server, which performs the encoding $s''_i=((\lambda_1(\rho_1(s_1))), \ldots, (\lambda_n(\rho_n(s_n))))$, then sends the node-encoded secret $s''_i$ to the whitebox implementation. In this embodiment, elements $\lambda_1, \lambda_2, \ldots, \lambda_n$ 356-1-356-N, random bijections $\mu_1, \mu_2, \ldots \mu_n$, (354-1-354-N) $\pi_1, \pi_2, \ldots, \pi_{n+1}$ (360-1-360-N)$\in S^T$ and functions $\sigma_1, \sigma_2, \ldots, \sigma_n$ (372-1-372-N)$\in\Sigma$ are generated to bind the white-box implementation to the node instance, calling application instance, and the dynamic secret $s''_i=((\lambda_1(\rho_1(s_1))), \ldots, (\lambda_n(\rho_n(s_n))))$.

White-box node-locking restricts the operation of a white-box implementation to a specific node to mitigate against situations where a white-box implementation is moved from an authorized node to an unauthorized node (known as a code-lifting attack). In this context, a "node" 412 can refer to any combination of entities. Such entities can include any combination of one or more hardware devices, containerized environments, one or more virtual machine instances. The Node ID of such a node can be derived as a combination of the identifiers of each such entity in the combination. The definition of a node is configured by the developer, and is associated with data elements that include a fingerprint C (270) of the node and the Node ID.

Figure 4:
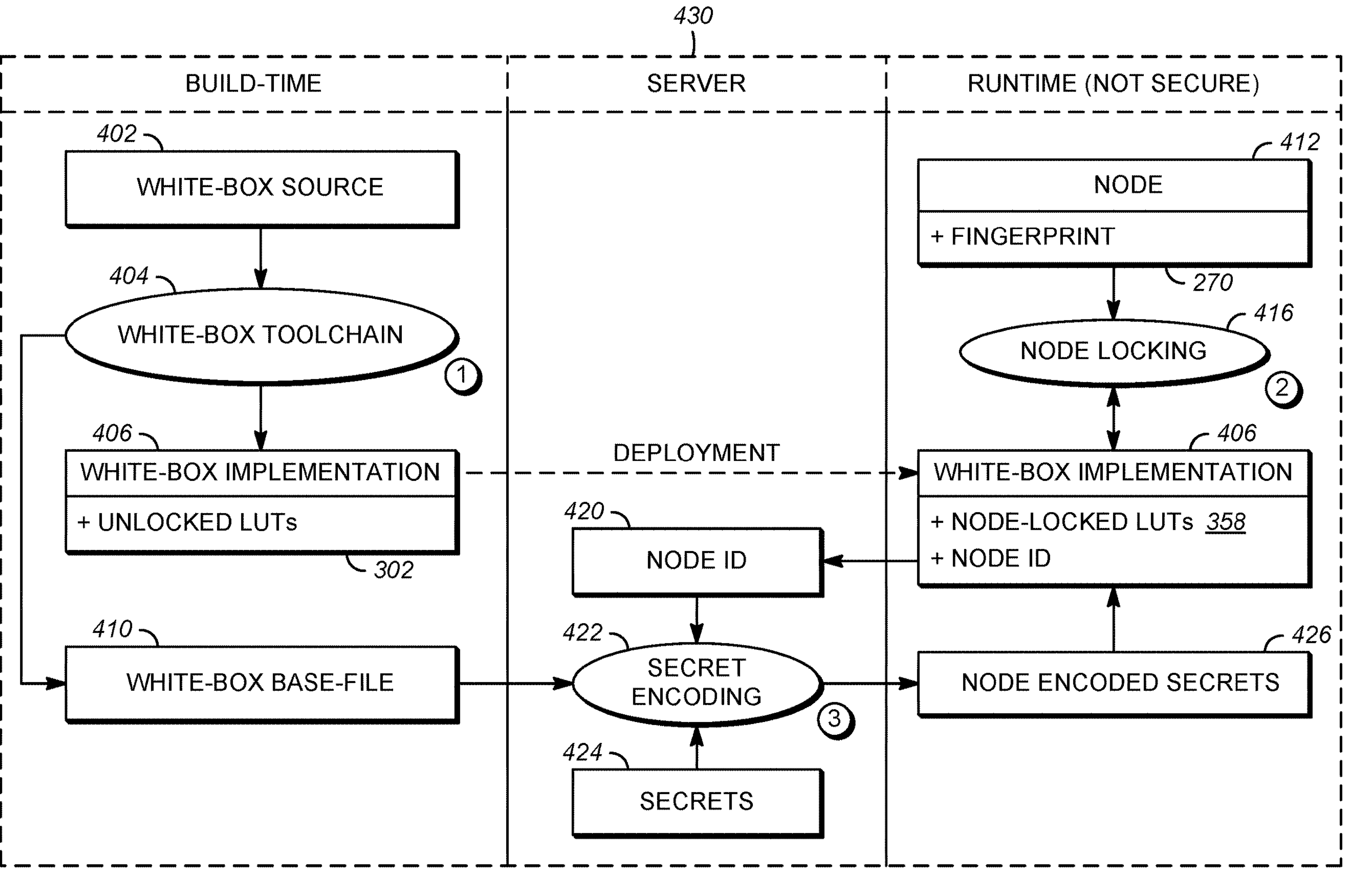
FIG. 4 is a diagram illustrating the process of node-locking a white-box implementation.

FIG. 4 is a diagram illustrating the process of node-locking a white-box implementation. In Step 1, a white-box toolchain 404 such as a white-box Open SSL engine, accepts white-box source code 402 and generates, at build-time, a base file 410 and a white-box implementation 406 having a series of unlocked LUTs 302-1-302N, hereinafter collectively referred to as unlocked LUTs 302. The base file 410 is essentially a white-box private key that is used to build the white-box implementation and encode secrets for use of the white-box. These unlocked LUTs 302 are unable to operate until they are locked to a specific node 412, as described below.

Step 2 involves node locking the unlocked LUTs 302 in the deployed whitebox implementation 406, to generate node locked LUTs 352-1-352-N (hereinafter collectively referred to as node locked LUTs 352), as shown in block 416. This is accomplished by first, generating the fingerprint C 270 of the node 412. The fingerprint C 270 can be any data that uniquely identifies the node 412. Since a node is broadly defined to include any combination of devices, applications or other elements, such data can include a combination of identifying data obtained from each of the of the elements of that node. For example, such identifying data can comprise a serial number, MAC address, or other identifying information of each of the elements of the node 412.

The node locking process 416 then generates a node ID $\lambda$ 420 that is used to encode all of the unlocked LUTs 302 (e.g. to include the $\lambda^{-1}$ transformation 356-1-356-N) for that specific node fingerprint C 270. This may be carried out at installation or first-time operation of the node 412. The Node ID $\lambda$ is a unique identifier representing a specific white-box implementation 406 locked to a particular node fingerprint C 270. The results are the node locked LUTs 358-1-358N that can be used to perform cryptographic operations, but only on the node 412 in which the correct fingerprint C 270 is present, as the fingerprint C 270 is required to generate the $\sigma$ transform 372-1-372-N, and only those that receive a properly encoded secret encoded by the node ID $s''_i=\lambda(\rho(s))$.

The unlocked LUTs 302 are unable to operate because the transformations ($\sigma$ 372-1-372-N) that apply the fingerprint C 270 of the node 412 to the encoding and the transformations ($\lambda^{-1}$ 356) that apply to the secret S at run time are not present in the node-locked LUTs 408 but rather set to a random transformation at build time. After the whitebox implementation is deployed and the node locked LUTs 352 are generated, the unlocked LUTs 302 are transformed to include both the node ID function $\lambda^{-1}$ 356 and the sigma function $\sigma$ 372. With these transformations, the encoded output of a preceding node locked LUT (e.g. 358-1) can be decoded and used by the following node-locked LUT (e.g. 358-2). For example, LUT $T_1$ 308-1 is configured to encode the output such that LUT $T_2$ 308-2 can decode and use the result. However, without such encodings in the node-locked LUTs, the output of one LUT (e.g. LUT $T'_1$ 358-1 will be unusable by the following LUT $T'_2$ 358-2.

Since every part of the white-box implementation 406 is dependent on a specific (independently sampled) node fingerprint C 270 there is no single point of failure (or security compromise), a common weakness with traditional node-locking and licensing systems.

In step 3, the white-box implementation 406 requests a dynamic secret s" by sending its Node ID λ 420 to a server 430. The server 430 first checks to determine if the request is valid, for example, using credentials provided by the node 412 and by comparing the Node ID 420 with known Node IDs 420. If the request is valid, the server 430 encodes the secret 424 (e.g. by λ) needed by the whitebox implementation 406 implemented on the node 412, as shown in block 422. The node-encoded secrets λ(ρ(s)) 426 are then provided to the whitebox implementation 406. These node-encoded secrets 426 are usable only by that white-box implementation 406 on that particular node 412, because the secret must be transformed by the transformation σ 372 of the fingerprint C 270 which is available at the node.

White-Box Soft Locking

To permit broad application, it is beneficial to have certain secrets (such as private keys and persistent symmetric keys) remain node-locked to each specific white-box instance, while other secrets should be able to be securely shared between different white-boxes (for example, in embodiments where white-boxes are chained together) in the manner of non-node-locked white-box implementations. However, with the foregoing white-box node-locking, all encoded secrets 426 are specifically encoded for each node locked LUT 358 of each node's white-box implementation 406. These secrets 424 cannot be directly read by other white-boxes implemented on other nodes, even if they are built with the same white-box base file 410. Instead, they require the use of a server 430 and node ID 420 component to pass data such as encoded secrets λ(ρ(S) or s" to the whitebox implementation, or encrypted and shared using white-box public key exchange or shared encoded static symmetric keys, for example, by the server 430. Such solutions are high in overhead if the same level of security is to be maintained. Accordingly, information cannot be chained between to different node-locked white-boxes, or a node locked whitebox and a non-node-locked whitebox.

White-box soft-locking as a low overhead method for implementing node-locking of specific cryptographic keys and secrets, making them unusable on some nodes, while retaining a set of globally encoded secrets that can be securely utilized by other node-locked white-box instances. Soft-locking streamlines implementations where a common white-box implementation is used across multiple nodes, and removes the need for a node ID.

Figure 5:
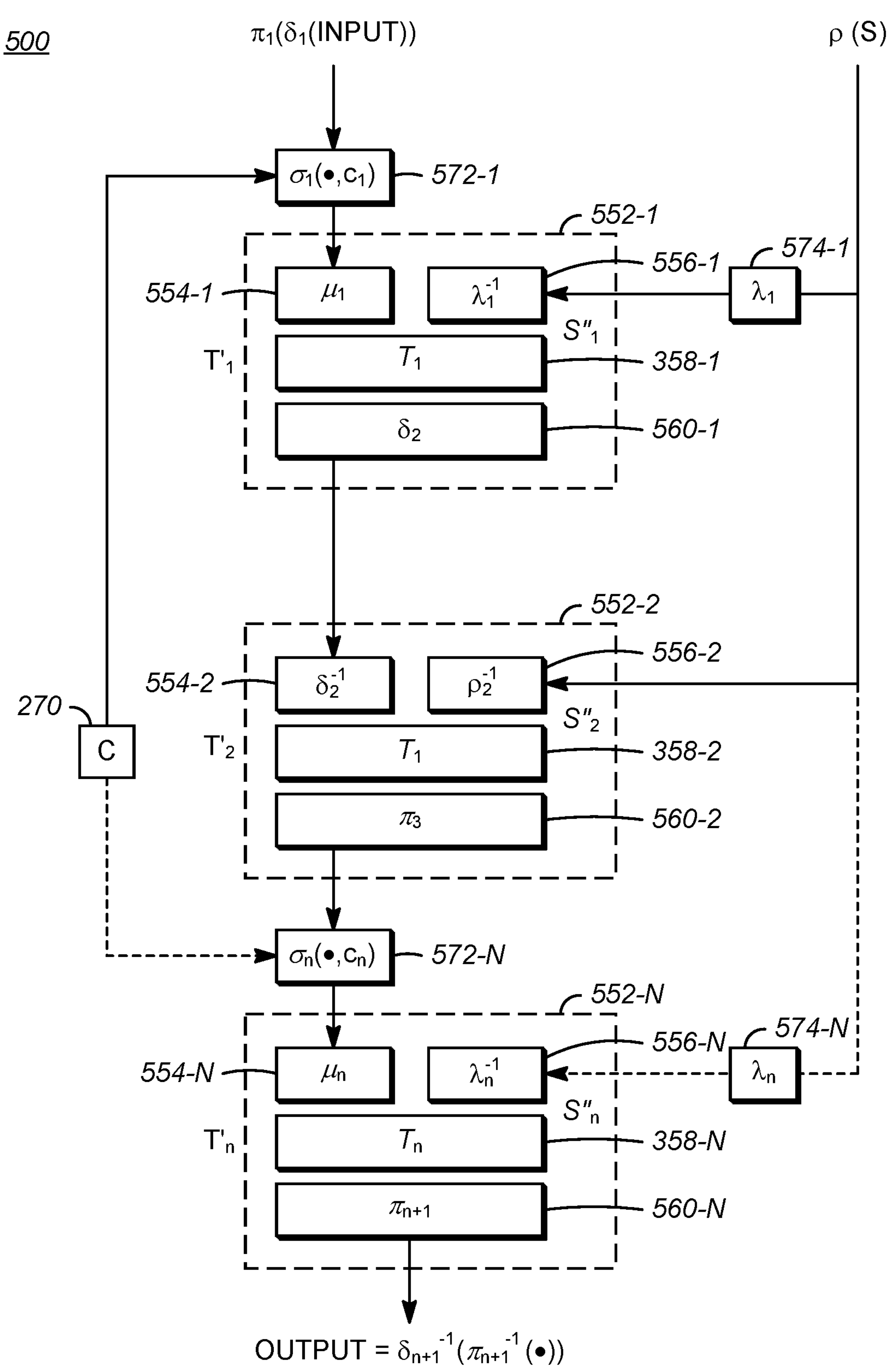
FIG. 5 is a diagrams illustrating an embodiment of a soft-locked dynamic white box implementation.

FIG. 5 is a diagrams illustrating an embodiment of a soft-locked dynamic white box implementation. Unlike the node locked whitebox implementation illustrated in FIG. 3B, This embodiment includes node-locked LUTs (e.g. 552-1 and 552-N) in series with unlocked LUTs (e.g. 552-2). Node locked LUTs 552-1 and 552-N require a function ($\sigma_1$ and $\sigma_n$, for example) to transform output of the input of the Node locked LUT (whether the input or the output of the preceding LUT) into values that can be used by the respective node locked LUT. For example, node locked LUT 508-1 requires the input to be transformed by first function 572-1, and node-locked LUT 552-N requires its input to be first transformed by function 572-N. Note also that the node locked LUTs 552-1 and 552-N require a transformation of the encoded secret according to the associated member of the vector $\lambda=(\lambda_1, \lambda_2, \ldots, \lambda_n)$. In the illustrated embodiment, this is implemented by applying $\lambda_1$ 574-1 to $\rho_1(s_1)$ and $\lambda_n$ 574-N to $(\rho_n(s_n))$ so that encoding $s''_1=(\lambda_1(\rho_1(s_1)))$ and $s''_1=(\lambda_n(\rho_n(s_n))))$. This customizes the encoded secret ρ(S) to a the node-locked LUTs 552-1 and 552-N, which invert the transformation of 574-1 and 574-N, with 556-1 and 556-N, respectively. Importantly, unlike the embodiment shown in FIG. 3B, the Node ID λ need not be sent a server to perform the encoding $s''_i=((\lambda_1(\rho_1(s_1))), \ldots, (\lambda_n(\rho_n(s_n))))$. Instead, the transformations for the node-locked LUTs 552-1 and 552-N is performed by function $\lambda_1$ 574-1 and $\lambda_n$ 574-N, respectively.

As was true with the node locked LUTs 372-1 and 372-N of FIG. 3B, the node-locked LUTs 552-1 and 552-N include random bijections $\mu_1$ and $\mu_n$, (554-1 and 554-N, respectively) to operate on the input of the respective LUT and $\pi_1, \pi_2, \ldots, \pi_{n+1}$ (356-1-356-N)$\in S^T$ and functions $\sigma_1, \sigma_1, \ldots, \sigma_n$ (372-1-372-N)$\in\Sigma$ are generated to bind the white-box implementation to the node instance, calling application instance, and the dynamic secret $s''_i=((\lambda_1(\rho_1(s_1))), \ldots, (\lambda_n(\rho_n(s_n))))$.

Also noteworthy is that since unlocked LUT 552-2 follows node-locked LUT 552-1, node-locked LUT 552-1 includes bijection $\delta_2$, which transforms the output of LUT 552-1 in a way that is accounted for by inverse bijection $\delta_2$ in the unlocked LUT 552-2 which follows LUT 552-1 and accepts the output of LUT 552-1 as an input. Likewise, since unlocked LUT 552-2 provides its output to node locked LUT 552-N, it includes bijection $\pi_3$, which is accounted for by bijection $\mu_n$ in node-locked LUT 552-N.

Figure 6:
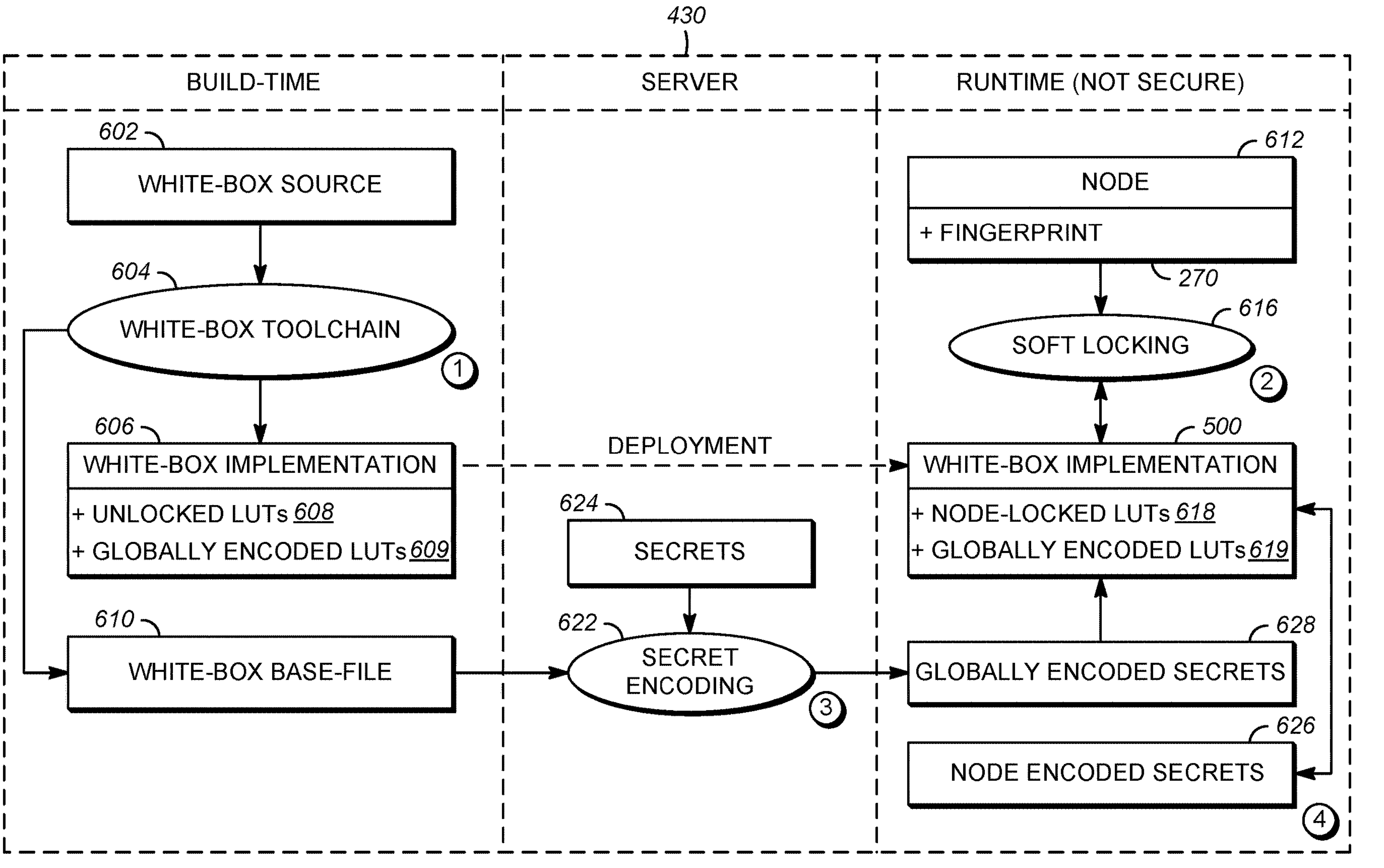
FIG. 6 is a diagram further illustrating one embodiment of a process of node-locking a dynamic white-box implementation.

FIG. 6 is a diagram further illustrating one embodiment of a process of node-locking a dynamic white-box implementation. In step 1, the whitebox toolchain 604, generates a soft-locked white-box implementation 606 at build-time from the whitebox source code 602 (defining the cryptographic operations to be performed). The resulting white-box implementation 606 includes unlocked LUTs 608 (such as unlocked LUTs 302-1 and 302-N) and globally encoded LUTs 608 (such as LUT 552-2). Unlocked LUTs 608 are unable to operate until they are locked to a specific node 612, for the same reasons described above with respect to node-locked white box implementations 306. These unlocked LUTs 608 are reserved for secrets that are node-encoded to a specific implementation on a specific node 612. Globally encoded LUTs 609 are standard white-box encoded lookup-tables that will enable white-boxes compiled with the same base-files to securely chain their secrets 624.

The soft-locking process 616 encodes the unlocked LUTs 608 in the white-box implementation for a specific node fingerprint C 270, and also alters the globally encoded LUTs 609 that precede or follow a node-locked LUT 618. For example, the soft locking process 616 generates and applies transforms 572-1 and 572-N and 574-1 and 574-N to inputs to the node-locked LUTs 552-1 and 552-N. The soft locking process 616 also modifies the unlocked LUTs to add functions $\mu_1$ 554-1 to node-locked LUT 552-1 and $\mu_n$ to LUT 554-N. The soft locking process also modifies the globally encoded LUT 552-2 to add $\delta_2$ 560-1 to node locked LUT 552-1 so that the data is conditioned for provision to the following unlocked LUT 552-2, where the inverse function $\delta_2^{-1}$ 554-2 is implemented.

In the foregoing implementation, secrets S 624 are globally encoded by secret encoding operation 622 to produce globally encoded secrets ρ(S) that are shared with the soft-locked white-box 500. These may be received from a server 430 that possesses the appropriate base-file 610, or from another white-box implementation of another device of another node that is generated with the same base file 610 (not shown in diagram).

These globally encoded secrets are provided to the LUTs 552-1-552-N, and the white-box 500 transforms secrets intended for the node-locked LUTs 552-1 and 552-N (e.g. to produce $s''_1$ and $s''_2$) before such provision to the node-locked LUTs. These secrets are only usable by the white-box 500 on that specific node 612 and cannot be used by other white-boxes. Ideal candidates for node-encoded secrets are private keys and persistent symmetric keys, as further described below.

FIG. 7 is a diagram of one embodiment of a technique for using a soft-locked white-box to enable secure generation of an output. In block 702, a white-box implementation 606 is generated according to a base file 610 having a plurality of secrets. The white-box implementation 606 has unlocked white-box LUTs 608 (for example LUTs 352-1 and 352-N), that will be used with node encoded secrets that are encoded for operation solely on a particular node 612 of a network and globally encoded white-box LUTs 609 (for example, LUT 302-2) for globally encoded secrets to be encoded for operation on the node 612 and optionally, at least one other node.

In block 704, a soft-locked white-box implementation 500 is generated according to a fingerprint 270 of the node 612, the unlocked white-box LUTs 608 and the globally encoded white-box LUTs 609. The soft-locked white-box implementation has a plurality of node-specific locked white-box LUTs 618 (for example, LUTs 552-1 and 552-N) and modified globally encoded LUTs 619 (for example, LUTs 552-2). In block 706, a global secret $\rho(S)$ encoded to the base file 610 is received. In block 708, node-encoded secrets (for example $s''_1$ and $s''_n$ are generated by applying node-specific locking transformations (e.g. 574-1 and 574-N) to the secret $\rho(S)$. In block 710, the node 612 generates the output according to at least one of the globally-encoded secrets 628 or the node-encoded secrets 626.

Figure 8:
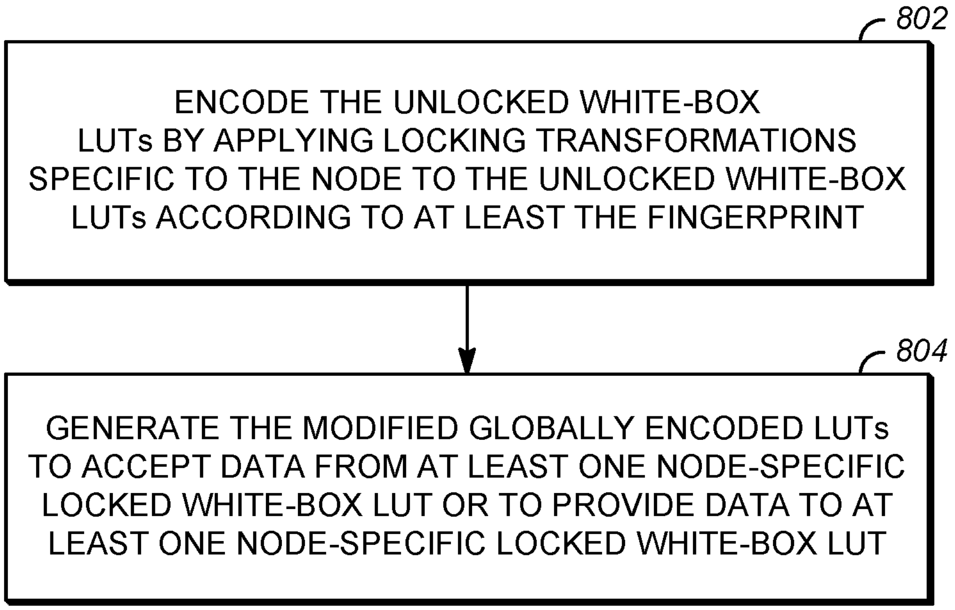
FIG. 8 is a diagram illustrating one embodiment of exemplary operations used to generate the soft-locked whitebox implementation.

FIG. 8 is a diagram illustrating one embodiment of exemplary operations used to generate the soft-locked whitebox implementation. As shown in block 802, the unlocked white-box LUTs are encoded by applying locking transformations specific to the node (for example $\sigma_1(\bullet,c_1)$ 572-1, $\mu_1$ 554-1, $\sigma_n(\bullet,c_n)$ 572-N and $\mu_n$ 554-N) to the unlocked whitebox LUTs 302-1 and 302-N according to the fingerprint 270 (and optionally, other factors). In block 804, the modified globally encoded LUTs are generated to accept data from at least one node-specific locked white-box LUT or to provide data to at least one node specific locked white-box LUT, for example, by adding transformation $\pi_3$ 560-2.

Use Cases

Figure 9:
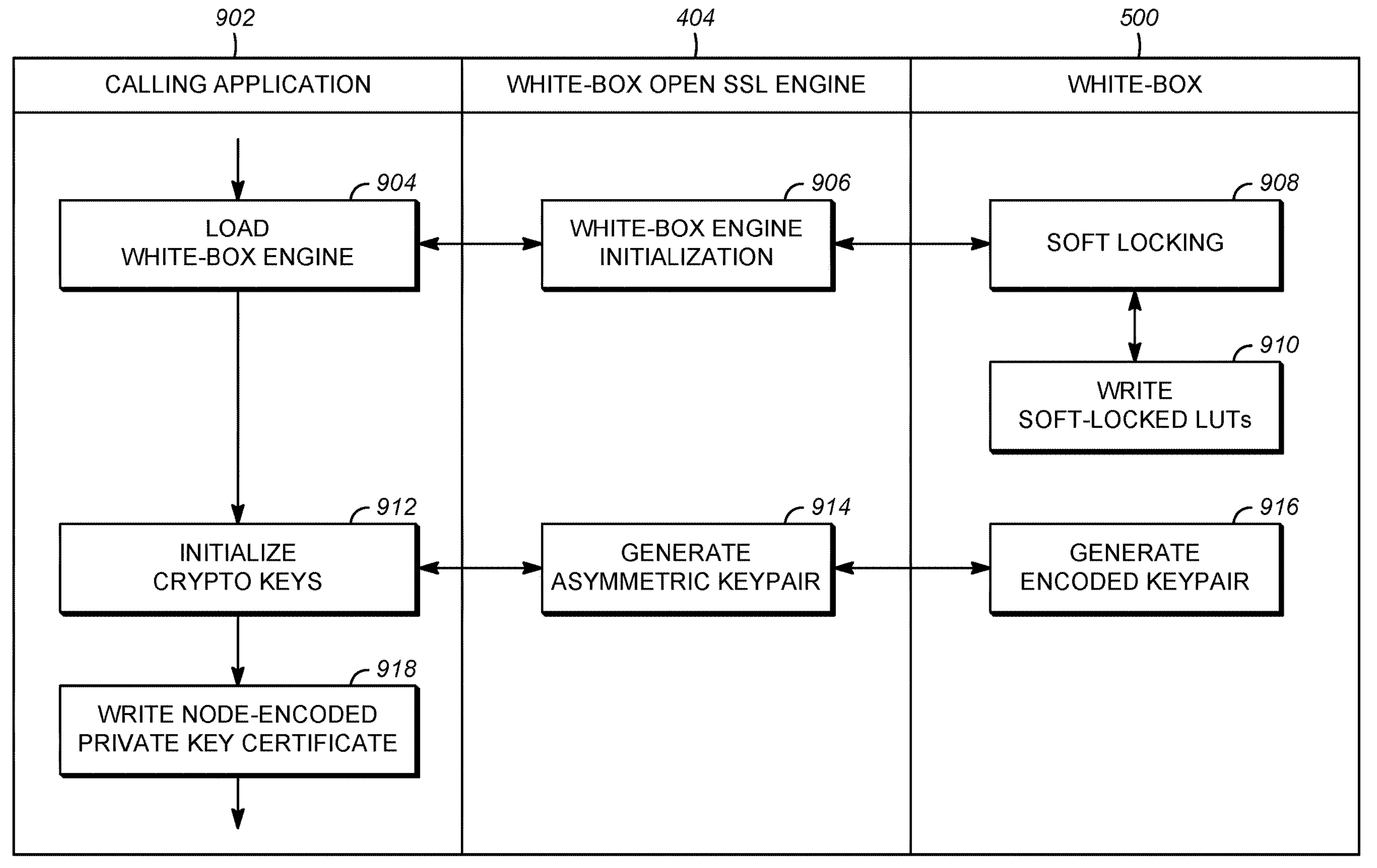
FIG. 9 is a diagram illustrating an exemplary use case for the soft-locked white-box in which the output comprises an asymmetric key pair encoded to the node.

FIG. 9 is a diagram illustrating an exemplary use case for the soft-locked white-box 500 in which the output comprises an asymmetric key pair encoded to the node. In block 904, a calling application 902 loads a white-box Open SSL engine 404. In block 906, the white-box engine of the whitebox toolchain 404 is initialized, thus invoking the white-box soft-locking procedure 908 in which a fingerprint is generated and the fingerprint is used to generate a soft-locked white-box, as described blocks 908 and 910. The node locked LUTs 618 and globally encoded LUTs 619 of the soft-locked white-box implementation 500 are persisted for later use by the node. In block 912, the calling application 902 requests encoded asymmetric key pair. In block 914, the white-box Open SSL engine 404 generates the asymmetric key pair, and in block 916, the generated asymmetric key pair is node-encoded according to the node-specific locking transformations. That node-encoded asymmetric key pair (which is only usable on the node from whose fingerprint the encoded asymmetric pair was derived) along with a digital certificate derived from that key pair) can be provided to calling application 902, as shown in block 918. The key pair is only usable on the node In one embodiment, only the private key of the asymmetric key pair may be encoded for use on a particular node, and a certificate generated from that private key. That certificate is also only usable on the node associated with the fingerprint used to derive the soft-locked whitebox 500.

Figure 10:
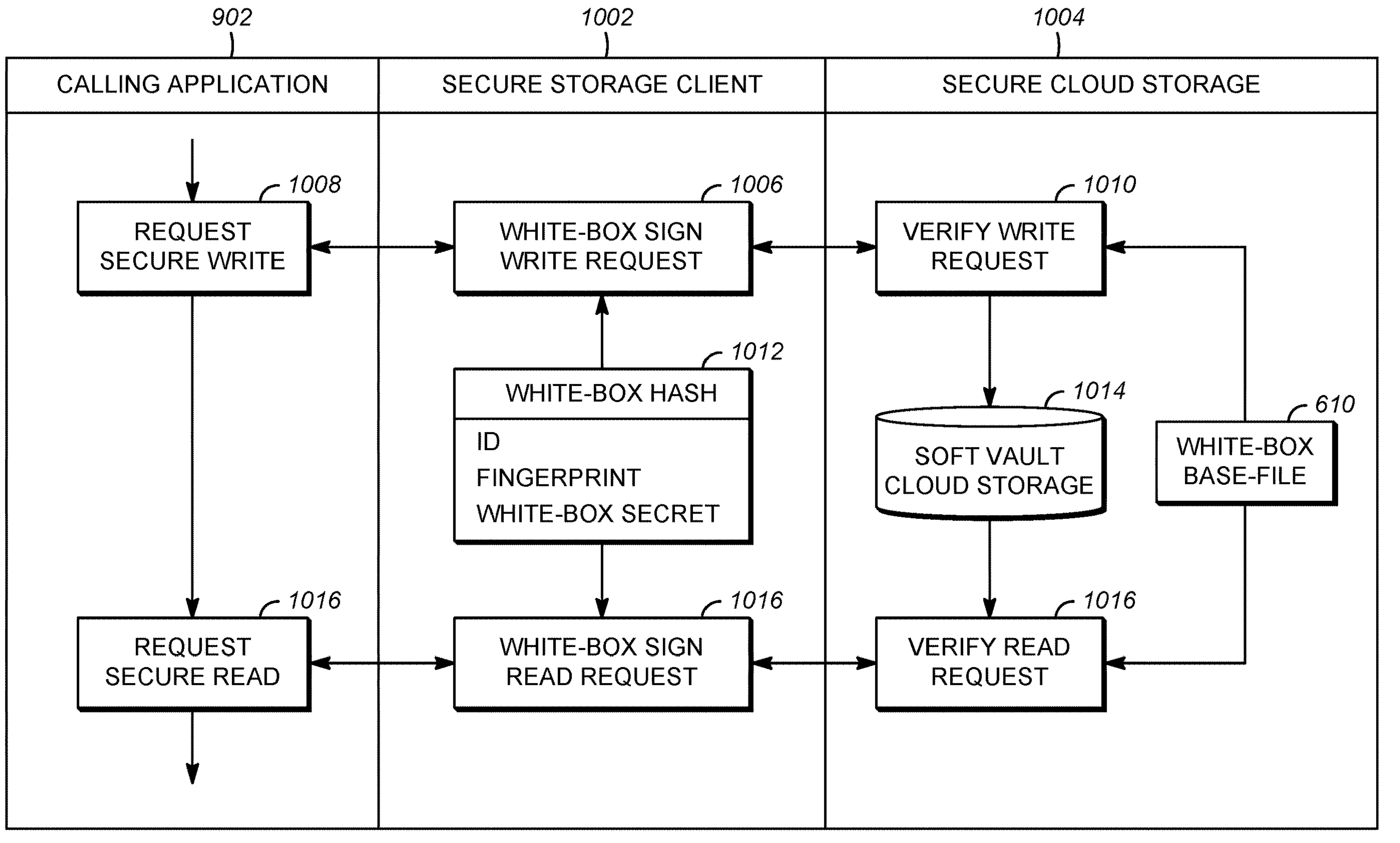
FIG. 10 is a diagram illustrating another exemplary use case wherein a soft-vault provides secure cloud-based storage for specific applications and/or users.

FIG. 10 is a diagram illustrating another exemplary use case wherein a soft-vault provides secure cloud-based storage for specific applications and/or users. In block 1008, the calling application 902 requests an operation to write data to secure cloud storage in the cloud 1004. Optimally, the data to be written is already node-encoded by a previous white-box operation according to the node-specific node locking transformations. Next, a cryptographic hash is generated from a unique identifier of the data, the fingerprint of the node, at least one of the node-encoded secrets, and optionally, the data itself, as shown in block 1012. This cryptographic hash is then used by using at least one of the node-specific locked white-box LUTs of a soft-locked white-box implementation to sign the write request (and the data to be written), as shown in blocks 1006 and 1016.

In block 1010, the cloud storage 1004. receives the write request and verifies the write request using the white box base file 610 that was used to build the soft-locked white-box implementation 500, verifies the write request. This white-box base file 610 is not available to the secure storage client 1002. If the write request is verified, the data is written to cloud storage 1014.

When the calling application 902 desires to read the data written to the cloud storage 1004, it generates a secure read request, as shown in block 1016. The secure storage client 1002 uses the soft-locked white-box 500 to securely sign the read request with the white-box hash generated above. The has uniquely identifies the data for that white-box implementation 500 on that node. The secure cloud storage 1004 receives the signed read request, and using the white-box base file 610, verifies the read request and returns the node-encoded data to the secure storage client 1002. Even if the node-encoded data is extracted, it can only be utilized by the white-box running on the node it was originally generated on, as the data was encoded for that purpose.

Hardware Environment

Figure 11:
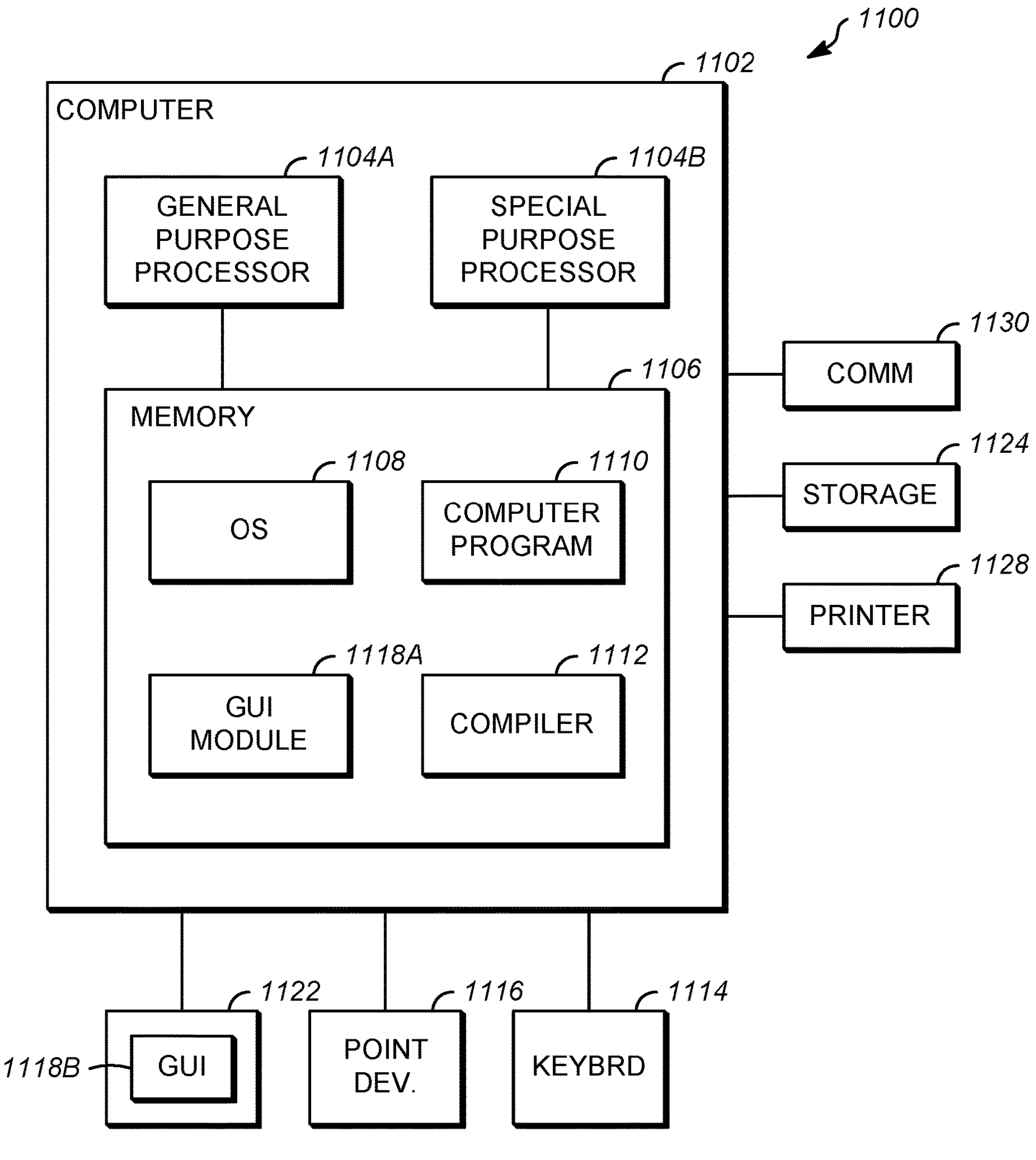
FIG. 11 illustrates an exemplary computer system that could be used to implement processing elements of the white-box implementations.

FIG. 11 illustrates an exemplary computer system 1100 that could be used to implement processing elements of the above disclosure, including at least some of the entities that together comprise the node 412, the server 430, or a computer system used to generate the white-box implementations at build time.

The computer 1102 comprises a processor 1104 and a memory, such as random access memory (RAM) 1106. The computer 1102 is operatively coupled to a display 1122, which presents images such as windows to the user on a graphical user interface 1118B. The computer 1102 may be coupled to other devices, such as a keyboard 1114, a mouse device 1116, a printer 1128, etc. Of course, those skilled in the art will recognize that any combination of the above components, or any number of different components, peripherals, and other devices, may be used with the computer 1102.

Generally, the computer 1102 operates under control of an operating system 1108 stored in the memory 1106, and interfaces with the user to accept inputs and commands and to present results through a graphical user interface (GUI) module 1118A. Although the GUI module 1118B is depicted as a separate module, the instructions performing the GUI functions can be resident or distributed in the operating system 1108, the computer program 1110, or implemented with special purpose memory and processors. The computer 1102 also implements a compiler 1112 which allows an application program 1110 written in a programming language such as COBOL, C++, FORTRAN, or other language to be translated into processor 1104 readable code. After completion, the application 1110 accesses and manipulates data stored in the memory 1106 of the computer 1102 using the relationships and logic that was generated using the compiler 1112. The computer 1102 also optionally comprises an external communication device such as a modem, satellite link, Ethernet card, or other device for communicating with other computers.

In one embodiment, instructions implementing the operating system 1108, the computer program 1110, and the compiler 1112 are tangibly embodied in a computer-readable medium, e.g., data storage device 1124, which could include one or more fixed or removable data storage devices, such as a zip drive, floppy disc drive, hard drive, CD-ROM drive, tape drive, etc. Further, the operating system 1108 and the computer program 1110 are comprised of instructions which, when read and executed by the computer 1102, causes the computer 1102 to perform the operations herein described. Computer program 1110 and/or operating instructions may also be tangibly embodied in memory 1106 and/or data communications devices 1130, thereby making a computer program product or article of manufacture. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method of enabling secure generation of an output. The method comprises generating a white-box implementation according to a base file having a plurality of secrets, the white-box implementation having: unlocked white-box LUTs for node-encoded secrets, the node-encoded secrets to be encoded for operation solely on a node of a network; and globally encoded white-box LUTs for globally-encoded secrets to be encoded for operation on the node and at least another node; generating, a soft-locked white-box implementation according to a fingerprint of the node, the unlocked white-box LUTs, and the globally encoded white-box LUTs, the soft-locked white-box implementation having a plurality of node-specific locked white-box LUTs and modified globally encoded LUTs; receiving a global secret encoded according to the base file; generating the node-encoded secrets by applying node-specific locking transformations to the global secret; and generating, by the node, the output according to at least one of the globally-encoded secrets or the node-encoded secrets.

Implementations may include one or more of the following features:

Any of the methods above, wherein generating the soft-locked white-box implementation according to the fingerprint of the node may include: encoding the unlocked white-box LUTs by applying locking transformations specific to the node to the unlocked white-box LUTs according to at least the fingerprint; and generating the modified globally encoded LUTs to accept data from at least one node-specific locked white-box LUT or to provide data to at least one node-specific locked white-box LUT.

Any of the methods above, wherein the method further may include generating the fingerprint of the node.

Any of the methods above, wherein the node may include a plurality combination of a entities selected from a group may include: one or more hardware devices; and one or more virtual machine instances.

Any of the methods above, wherein the global secret is received from a server having the base file.

Any of the methods above, wherein the global secret is received from a second white-box implementation of another device of another node and is generated according to the base file.

Any of the methods above, wherein the output may include an asymmetric key pair encoded for the node; and generating the output according to at least one of the globally-encoded secrets or the node-encoded secrets may include: receiving a request for the encoded asymmetric key pair; generating the asymmetric key pair; and node-encoding the generated asymmetric key pair according to the node-specific locking transformations.

Any of the methods above, wherein the output may include a digital certificate encoded for the node; and generating the output according to at least one of the encoded global secrets or the node-encoded secrets may include: receiving a request for the digital certificate encoded for the node; generating an asymmetric key pair; and generating the digital certificate from the asymmetric key pair; and node-encoding a private key of the digital certificate according to the node-specific locking transformations.

Any of the methods above, wherein the output may include a write request signed by the white-box implementation; and generating the output according to at least one of the encoded global secrets or the node-encoded secrets may include: receiving a request for an operation to write data to secure cloud storage where the data is node-encoded according to the node-specific node locking transformations; generating a cryptographic hash from a unique identifier of the data, the fingerprint, and one of the node-encoded secrets; and signing the request for the operation to write data and the data according to the generated cryptographic hash using at least one of the node-specific locked white-box LUTs of the soft-locked white-box implementation; and where the secure cloud storage verifies the write request according to the base file before writing the data to the secure cloud storage.

Another embodiment is evidenced by an apparatus for securely generating an output. The apparatus comprises a first processor; a first memory, communicatively coupled to the processor, the first memory storing processor instructions may include processor instructions for: generating a white-box implementation according to a base file having a plurality of secrets, the white-box implementation having: unlocked white-box look up table (LUTs) for node-encoded secrets, the node-encoded secrets to be encoded for operation solely on a node of a network; and globally encoded white-box LUTs for globally-encoded secrets to be encoded for operation on the node and at least another node. The apparatus also includes a second processor; a second memory, communicatively coupled to the second processor, the second memory storing second processor instructions may include second processor instructions for: generating, a soft-locked white-box implementation according to a fingerprint of the node, the unlocked white-box LUTs, and the globally encoded white-box LUTs, the soft-locked white-box implementation having a plurality of node-specific locked white-box LUTs and modified globally encoded LUTs; receiving a global secret encoded according to the base file; generating the node-encoded secrets by applying node-specific locking transformations to the global secret; and generating the output according to at least one of the globally-encoded secrets or the node-encoded secrets.

Implementations may include one or more of the following features:

Any apparatus described above, wherein the second processor instructions for generating the soft-locked white-box implementation according to the fingerprint of the node may include second processor instructions for: encoding the unlocked white-box LUTs by applying locking transformations specific to the node to the unlocked white-box LUTs according to at least the fingerprint; and generating the modified globally encoded LUTs to accept data from at least one node-specific locked white-box LUT or to provide data to at least one node-specific locked white-box LUT.

the second processor instructions further may include second processor instructions for generating the fingerprint of the node.

Any apparatus described above, wherein the node may include a plurality combination of a entities selected from a group may include: one or more hardware devices; and one or more virtual machine instances.

Any apparatus described above, wherein the global secret is received from a server having the base file.

Any apparatus described above, wherein the global secret is received from a second white-box implementation of another device of another node and is generated according to the base file. Any apparatus described above, wherein the output may include an asymmetric key pair encoded for the node; and the second processor instructions for generating the output according to at least one of the globally-encoded secrets or the node-encoded secrets may include second processor instructions for: receiving a request for the encoded asymmetric key pair; generating the asymmetric key pair; and node-encoding the generated asymmetric key pair according to the node-specific locking transformations.

Any apparatus described above, wherein the output may include a digital certificate encoded for the node; and the second processor instructions for generating the output according to at least one of the encoded global secrets or the node-encoded secrets may include second processor instructions for: receiving a request for the digital certificate encoded for the node; generating an asymmetric key pair; and generating the digital certificate from the asymmetric key pair; and node-encoding a private key of the digital certificate according to the node-specific locking transformations.

Any apparatus described above, wherein the output may include a write request signed by the white-box implementation; and the second processor instructions for generating the output according to at least one of the encoded global secrets or the node-encoded secrets may include second processor instructions for: receiving a request for an operation to write data to secure cloud storage where the data is node-encoded according to the node-specific node locking transformations; generating a cryptographic hash from a unique identifier of the data, the fingerprint, and one of the node-encoded secrets; and signing the request for the operation to write data and the data according to the generated cryptographic hash using at least one of the node-specific locked white-box LUTs of the soft-locked white-box implementation; and where the secure cloud storage verifies the write request according to the base file before writing the data to the secure cloud storage.

The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A method of enabling secure generation of an output, comprising:

generating a white-box implementation according to a base file having a plurality of secrets, the white-box implementation having:

unlocked white-box look up tables (LUTs) for node-encoded secrets, the node-encoded secrets encoded for operation solely on a node of a network; and globally encoded white-box LUTs for globally-encoded secrets encoded for operation on the node and at least another node;

generating, a soft-locked white-box implementation according to a fingerprint of the node, the unlocked white-box LUTs, and the globally encoded white-box LUTs, the soft-locked white-box implementation having a plurality of node-specific locked white-box LUTs and modified globally encoded white box LUTs;

receiving a global secret encoded according to the base file;

generating the node-encoded secrets by applying node-specific locking transformations to the global secret; and generating, by the node, the output according to at least one of the globally-encoded secrets or the node-encoded secrets; comprising:

receiving a request for the output;

generating an asymmetric key pair including a private key; and node-encoding the output, the output comprising at least one of: (i) the asymmetric key pair encoded for the node according to the node-specific locking transformations and (ii) a digital certificate encoded for the node and generated from the asymmetric key pair, the private key encoded for the node according to the node-specific locking transformations.

2. The method of claim 1, wherein generating the soft-locked white-box implementation according to the fingerprint of the node comprises:

encoding the unlocked white-box LUTs by applying locking transformations specific to the node to the unlocked white-box LUTs according to at least the fingerprint; and generating the modified globally encoded LUTs to accept data from at least one node-specific locked white-box LUT or to provide data to at least one node-specific locked white-box LUT.

3. The method of claim 1, wherein:

the method further comprises generating the fingerprint of the node.

4. The method of claim 3, wherein:

the node comprises a plurality combination of a entities selected from a group comprising:

one or more hardware devices; and one or more virtual machine instances.

5. The method of claim 1, wherein:

the global secret is received from a server having the base file.

6. The method of claim 1, wherein:

the global secret is received from a second white-box implementation of another device of another node and is generated according to the base file.

7. An apparatus for securely generating an output, comprising:

a first processor;

a first memory, communicatively coupled to the processor, the first memory storing processor instructions comprising processor instructions for:

generating a white-box implementation according to a base file having a plurality of secrets, the white-box implementation having:

unlocked white-box look up tables (LUTs) for node-encoded secrets, the node-encoded secrets encoded for operation solely on a node of a network; and globally encoded white-box LUTs for globally-encoded secrets to be encoded for operation on the node and at least another node;

a second processor;

a second memory, communicatively coupled to the second processor, the second memory storing second processor instructions comprising second processor instructions for:

generating, a soft-locked white-box implementation according to a fingerprint of the node, the unlocked white-box LUTs, and the globally encoded white-box LUTs, the soft-locked white-box implementation having a plurality of node-specific locked white-box LUTs and modified globally encoded LUTs;

receiving a global secret encoded according to the base file;

generating the node-encoded secrets by applying node-specific locking transformations to the global secret; and generating the output according to at least one of the globally-encoded secrets or the node-encoded secrets; wherein the output comprises a write request signed by the white-box implementation; and generating the output according to at least one of the encoded global secrets or the node-encoded secrets comprises:

receiving a request for an operation to write data to secure cloud storage wherein the data is node-encoded according to the node-specific node locking transformations;

generating a cryptographic hash from a unique identifier of the data, the fingerprint, and one of the node-encoded secrets; and signing the request for the operation to write data and the data according to the generated cryptographic hash using at least one of the node-specific locked white-box LUTs of the soft-locked white-box implementation; and wherein the secure cloud storage verifies the write request according to the base file before writing the data to the secure cloud storage.

8. The apparatus of claim 7, wherein the second processor instructions for generating the soft-locked white-box implementation according to the fingerprint of the node comprises second processor instructions for:

encoding the unlocked white-box LUTs by applying locking transformations specific to the node to the unlocked white-box LUTs according to at least the fingerprint; and generating the modified globally encoded LUTs to accept data from at least one node-specific locked white-box LUT or to provide data to at least one node-specific locked white-box LUT.

9. The apparatus of claim 7, wherein:

the second processor instructions further comprise second processor instructions for generating the fingerprint of the node.

10. The apparatus of claim 9, wherein:

the node comprises a plurality combination of a entities selected from a group comprising:

one or more hardware devices; and one or more virtual machine instances.

11. The apparatus of claim 7, wherein:

the global secret is received from a server having the base file.

12. The apparatus of claim 7, wherein:

the global secret is received from a second white-box implementation of another device of another node and is generated according to the base file.

* * * * *